US007716436B2

United States Patent
Coronado et al.

(10) Patent No.: US 7,716,436 B2
(45) Date of Patent: May 11, 2010

(54) DYNAMIC TIMER CONFIGURATION FOR MONITORING A LONG BUSY STATE IN A REMOTE MIRROR AND COPY ENVIRONMENT

(75) Inventors: Juan Alonso Coronado, Tucson, AZ (US); Dinh Hai Le, Tucson, AZ (US); Jayson Elliott Tsingine, Tucson, AZ (US); Warren Keith Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/831,501

(22) Filed: Jul. 31, 2007

(65) Prior Publication Data

US 2009/0037676 A1 Feb. 5, 2009

(51) Int. Cl.
*G06F 12/00* (2006.01)
(52) U.S. Cl. .................. 711/162; 711/112; 711/114; 711/154; 707/204; 713/502; 714/5; 714/15; 714/47
(58) Field of Classification Search ............ 711/162, 711/112, 114, 154; 707/204; 713/502; 714/5, 714/15, 47
See application file for complete search history.

(56) References Cited

U.S. PATENT DOCUMENTS

| 5,692,155 A * | 11/1997 | Iskiyan et al. ............ 711/162 |
| 6,304,980 B1 * | 10/2001 | Beardsley et al. ........... 714/6 |
| 7,024,584 B2 * | 4/2006 | Boyd et al. ................. 714/6 |
| 7,409,510 B2 * | 8/2008 | Werner et al. ............. 711/156 |
| 7,523,204 B2 * | 4/2009 | D'Costa et al. ............ 709/226 |
| 2009/0037677 A1 * | 2/2009 | Coronado et al. .......... 711/162 |

* cited by examiner

*Primary Examiner*—Stephen C Elmore
(74) *Attorney, Agent, or Firm*—Kunzler Needham Massey & Thorpe

(57) ABSTRACT

A system is disclosed that includes a host system to issue a write command, a primary storage controller to write data to a primary volume, and a secondary storage controller to mirror the data to a secondary volume. In the event the secondary storage controller is unable to mirror the data due to a busy state, a busy signal may be sent to the primary storage controller. The primary storage controller may initiate a timer in the event it receives the busy signal, and, in the event the busy state does not end before expiration of the timer, notify the host system that the primary and secondary volumes are in a suspended state. To alter the duration of the timer, the host system may be configured to dynamically alter the duration of the timer by sending a command to the primary storage controller.

8 Claims, 3 Drawing Sheets

DYNAMIC TIMER CONFIGURATION FOR MONITORING A LONG BUSY STATE IN A REMOTE MIRROR AND COPY ENVIRONMENT

BACKGROUND OF THE INVENTION

1. Field of the Invention

This invention relates to data storage devices and more particularly to systems and methods for dynamically configuring timers used to monitor long busy states in a remote mirror and copy environment.

2. Description of the Related Art

In a remote mirror and copy environment, whenever a primary (i.e., source) storage controller mirrors data to a secondary (i.e., target) controller, the primary controller monitors the state of the secondary volumes that are being used to mirror the data. The primary controller may utilize a "long busy" timer to monitor the state of the secondary volumes in a peer-to-peer remote copy (PPRC) relationship.

Conventionally, the long busy state timer in the primary storage controller has been hard coded to a certain value. Analysis of several critical field problems, however, has led to the discovery that the problems may have been prevented or mitigated if the long busy state timer had a different value than the hard coded value. Consequently, some customers may desire a long busy state timer that has a value greater than the hard coded value. This may reduce the likelihood that a suspended condition will occur when a secondary volume undergoes a lengthy error recovery process. Other customers, by contrast, may desire a long busy state timer with a reduced value so the suspended condition occurs more frequently. This may prevent application I/O from building up while a secondary storage controller undergoes a lengthy recovery process.

Currently, the only way a customer can change the value of the long busy state timer is using a peek-and-poke capability. The peek may be used to view the current value of the long busy state timer and the poke may be used to modify the value. When microcode in the primary controller detects a poke event, the microcode may replace the default value with a user-selected value. By design, the long busy state timer value may be persistent across initial microcode loads, warmstarts, and failure conditions in the storage controller.

Although a peek-and-poke process may provide a way to modify the value of the long busy state timer, it may still not be flexible enough to satisfy customer needs. Modifying the value may require user intervention and thus may be impossible to modify in real time. In addition, the peek-and-poke capability may be susceptible to errors because the timer value must normally be set in all clusters of one or more primary controllers, and the wrong variable may be poked. Poking the wrong variable may cause unpredictable behavior or even catastrophic failures in the storage system.

In view of the foregoing, what is needed is a system and method to dynamically alter the value of a long busy state timer. Ideally, the system and method could be used to modify the value in real time without requiring user intervention. Similarly, the system and method would ideally enable the timer value to be dynamically modified for different applications.

SUMMARY OF THE INVENTION

The present invention has been developed in response to the present state of the art, and in particular, in response to the problems and needs in the art that have not yet been fully solved by currently available systems and methods. Accordingly, the present invention has been developed to provide improved systems and methods to dynamically alter a long busy state timer in a remote mirror and copy environment.

In a first aspect of the invention, a system in accordance with the invention may include a host system to issue a write command. A primary storage controller may receive the write command and, in response, write data to a primary volume associated with the primary storage controller. A secondary storage controller may receive a copy of the data from the primary storage controller and mirror the data to a secondary volume associated with the secondary storage controller. In the event the secondary storage controller is unable to mirror the data because it is in a busy state, the secondary storage controller may send a busy signal to the primary storage controller. The primary storage controller may initiate a timer in the event it receives the busy signal. In the event the busy state does not end before expiration of the timer, the primary storage device may notify the host system that the primary and secondary volumes are in a suspended state. To alter the duration of the timer, the host system may be configured to dynamically alter the duration of the timer by sending a command to the primary storage controller.

In selected embodiments, the host system may be configured to dynamically alter the timer duration for different applications running on the host system. In other embodiments, the host system may be configured to dynamically alter the duration of the timer to correspond to other timers operated by the host system. In selected embodiments, the command is configured to modify the timer duration for at least one of a single volume pair, multiple volume pairs, and all volumes in a logical subsystem.

In another aspect of the invention, a method to dynamically alter a value of a long busy state timer in a remote mirror and copy environment may include issuing a write command and writing data to a primary volume in response to the write command. An attempt may be made to mirror the data to a secondary volume. In the event a busy condition exists that prevents mirroring the data to the secondary volume, a busy signal may be sent. A timer may be initiated in the event the busy signal is sent. The primary and secondary volumes may be suspended in the event the timer expires before the busy condition has ended. The method may further include dynamically altering the duration of the timer by issuing a command.

The present invention provides novel systems and methods for dynamically alternating a busy state timer in a remote mirror and copy environment. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
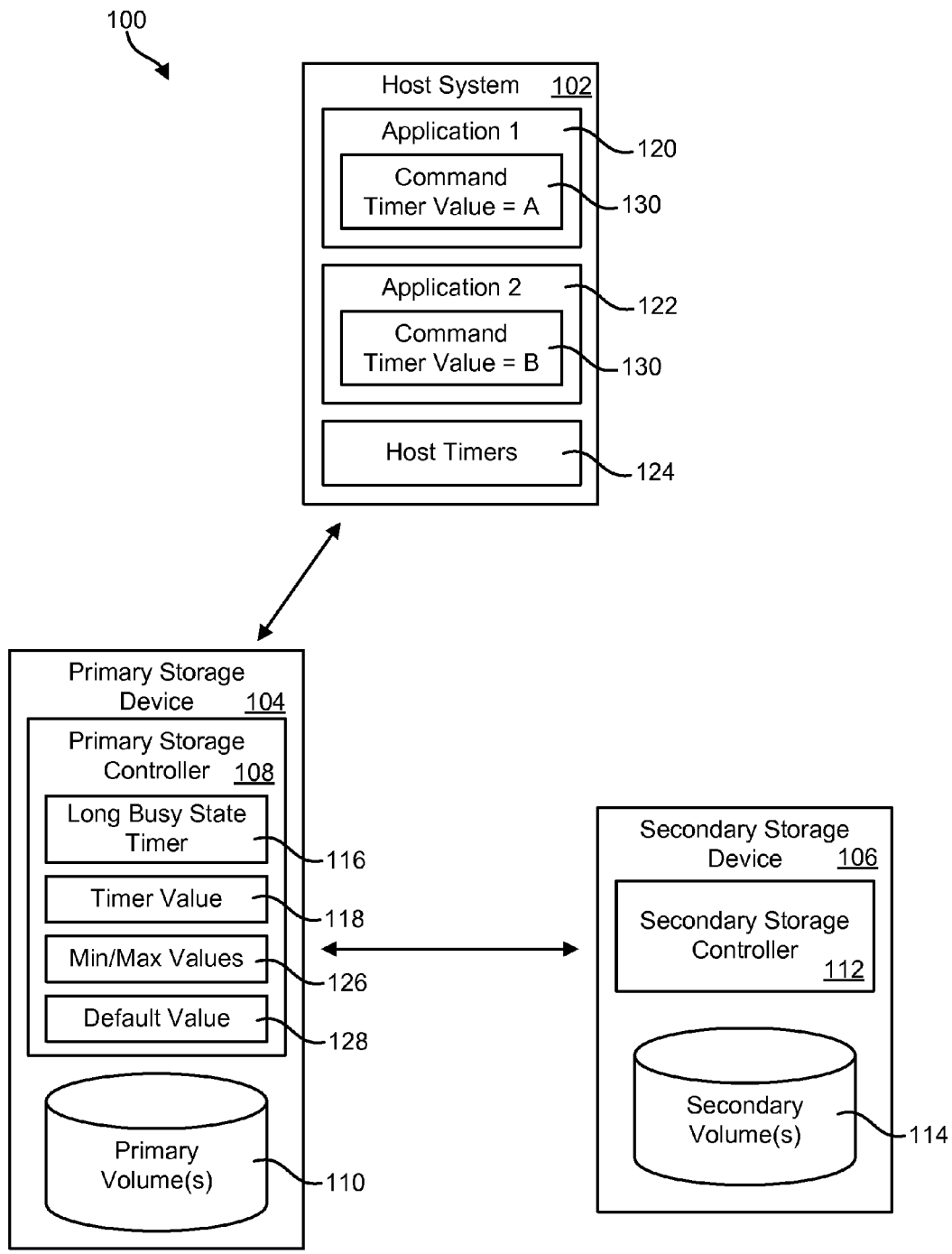
FIG. 1 is a high-level block diagram illustrating one embodiment of a system for dynamically altering a busy state timer in a remote mirror and copy environment.

Referring to FIG. 1, in selected embodiments, a system 100 in accordance with the invention may include a host system 102, a primary storage device 104, and a secondary storage device 106. A host system 102 may be configured to write to the primary storage device 104, which may include a primary storage controller 108 and one or more primary volumes 110 associated with the primary storage controller 108. Whenever data is written to the primary storage device 104, the data may be mirrored to a secondary storage device 106, which may include a secondary storage controller 112 and one or more secondary volumes 114. To keep the data in the volumes 110, 114 consistent, the system 100 may utilize a protocol such as Remote Mirror and Copy, Peer-to-Peer Remote Copy (PPRC), or other similar protocol.

In selected embodiments, whenever a primary storage controller 108 mirrors data to the secondary controller 112, the primary controller 108 may monitor the state of the secondary volumes 114. In certain embodiments, the primary controller 108 may utilize a "long busy state" timer 116 to monitor the state of the secondary volumes 114.

The long busy state timer 116 may be used to monitor the state of the secondary volumes 114 if the secondary storage controller 112 has rejected a primary volume I/O with a signal indicating it is in a long busy state. A secondary storage controller 112 may go into long busy state as a result of several conditions in the secondary storage controller 112. For example, the secondary controller 112 may return a long busy signal if it receives I/O during a warmstart or failover recovery process. In other cases, the secondary controller 112 may return a long busy signal if a disk drive module (DDM) is undergoing a recovery process.

Once the primary storage controller I/O is rejected with a long busy signal, the primary storage controller 108 may send a long busy signal to the host system 102 where the I/O originated. At this point, one of two events may occur. The secondary volumes 114 may change state from long busy to no longer long busy. Alternatively, the long busy state timer 116 may expire in the primary storage controller 108.

If the secondary volumes 114 transition from long busy to no longer long busy, the secondary storage controller 112 may notify the primary storage controller 108 that it is no longer in long busy state. The primary storage controller 108 may then notify the host system 102 that the volumes (i.e., the primary and secondary volumes 110, 114) are no longer in long busy state. The host 102 may then reinitiate the I/O that was previously rejected with long busy status.

Conversely, if the long busy state timer 116 expires, the primary storage controller 108 may query the secondary storage controller 112 to determine the state of the secondary volumes 114. One of two events may occur in response to this query. The secondary storage controller 112 may respond that the secondary volumes 114 are no longer long busy or the secondary storage controller 112 may respond that the secondary volumes 114 are still in long busy state. If the secondary volumes 114 are no longer in long busy state, the primary storage controller 108 may notify the host 102 that the volume is no longer in long busy state. The host 102 may then reinitiate the I/O that was rejected with long busy status.

If, on the other hand, the secondary volumes 114 are still in long busy state after the long busy state timer 116 has expired, the primary storage controller 108 may initiate its recovery process. The primary storage controller 108 may also suspend the secondary volumes 114 and report to the host 102 that the volumes (i.e., the primary and secondary volumes 110, 114) are suspended.

When the host 102 has been notified that the volumes 110, 114 are suspended, the host 102 may invoke its recovery procedure. For example, in a count-key-data (CKD) host environment, a recovery procedure called HyperSwap may be invoked. This procedure sends a freeze command to the primary storage controller 108 and the primary storage controller 108 in turn freezes all I/O to the volume pairs in the logical subsystem associated with the suspended volume. Hyper-Swap will then cause the host 102 to swap to the secondary storage controller 112. In essence, this causes the secondary storage controller 112 to become the primary storage controller 108.

The duration of the long busy state timer 116 may be controlled by a timer value 118. Unlike the hard-coded value described previously, the timer value 118 may be modified using a command 130 (e.g., PPRC Long Busy State timer) in accordance with the invention. This command 130 may provide a way for the host system 102 to manage and control the duration of the long busy state timer 116.

Using this command 130, a host 102 may adjust the duration of the long busy state timer 116 in real time. In selected embodiment, the command 130 may enable a host 102 to adjust the duration of the long busy state timer 116 for different applications 120, 122. For example, the duration of the long busy state timer 116 may be reduced when backing up a critical database. Likewise, the duration of the long busy state timer 116 may be increased when backing up a non-critical database.

In other embodiments, the command 130 may allow the host system 102 to adjust the duration of the long busy state timer 116 to correspond to one or more timers 124 of the host system 102. For example, an IBM S/390 host may set the duration of the timer 116 to correspond to a Missing Interrupt Handler (MIH) timeout value or to a Geographically Dispersed Parallel Sysplex (GDPS) timer.

In selected embodiments, the timer value 118 may be limited to a range of values. For example, if a command 130 attempts to set the timer duration above a maximum value 126 or below a minimum value 126, the microcode of the primary storage controller 108 may set the timer value 118 to a maximum or minimum value 126 closest to the desired value. Alternatively, the microcode may set the timer value 118 to a default value 128 between the maximum and minimum values 126.

In selected embodiments, the command 130 may be designed to provide selection granularity. For example, a first timer value 118 may be designated for Metro Mirror applications, whereas a different timer value 118 may be designated for Global Copy applications. Similarly, in other embodiments, the command 130 may be designed so that the host system 102 may designate a timer value 118 for a single volume pair, multiple volume pairs, or all volumes in a logical subsystem.

Figure 2:
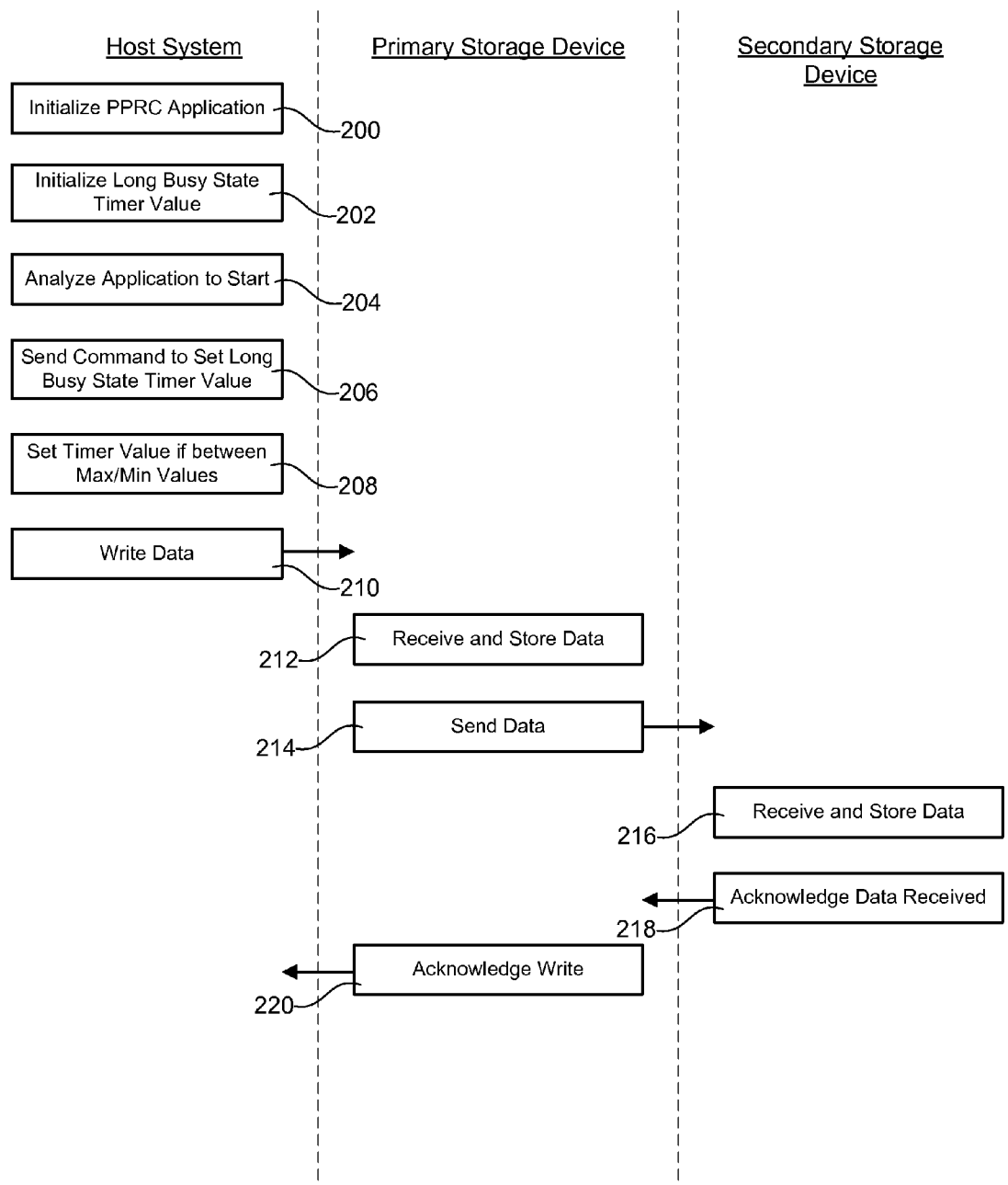
FIG. 2 is a flow chart illustrating one scenario that may be encountered by the system illustrated in FIG. 1.

Referring to FIG. 2, in a first scenario, a host system 102 may begin by initializing 200 a PPRC application and initializing 202 the value of the long busy state timer 116, such as with the default value 128. The host 102 may then analyze 204 an application to start on the host system 102 and send 206 a command to set the long busy state timer value 118 to a value that is desired for the application. If the timer value is between the maximum and minimum values 126, the primary storage controller may set 208 the timer value 118 to that indicated by the host 102. If the timer value is not between the maximum and minimum values 126, the primary storage controller may set 208 the timer value 118 to a value between the maximum and minimum values 126, such as to the default value 128.

The host system 102 may then attempt to write 210 data to the primary storage device 104. The primary storage device 104 may receive 212 and store 212 the data and send 214 a copy of the data to the secondary storage device 106 to mirror the data to the secondary volumes 114. If the secondary storage device 106 is not in long busy state, the secondary storage device 106 may store 216 the data in the secondary volumes 114 and send 218 an acknowledge signal to the primary storage device 104. The primary storage device 104 may then send 220 an acknowledge signal to the host system 102 indicating that the write operation has successfully completed.

Figure 3:
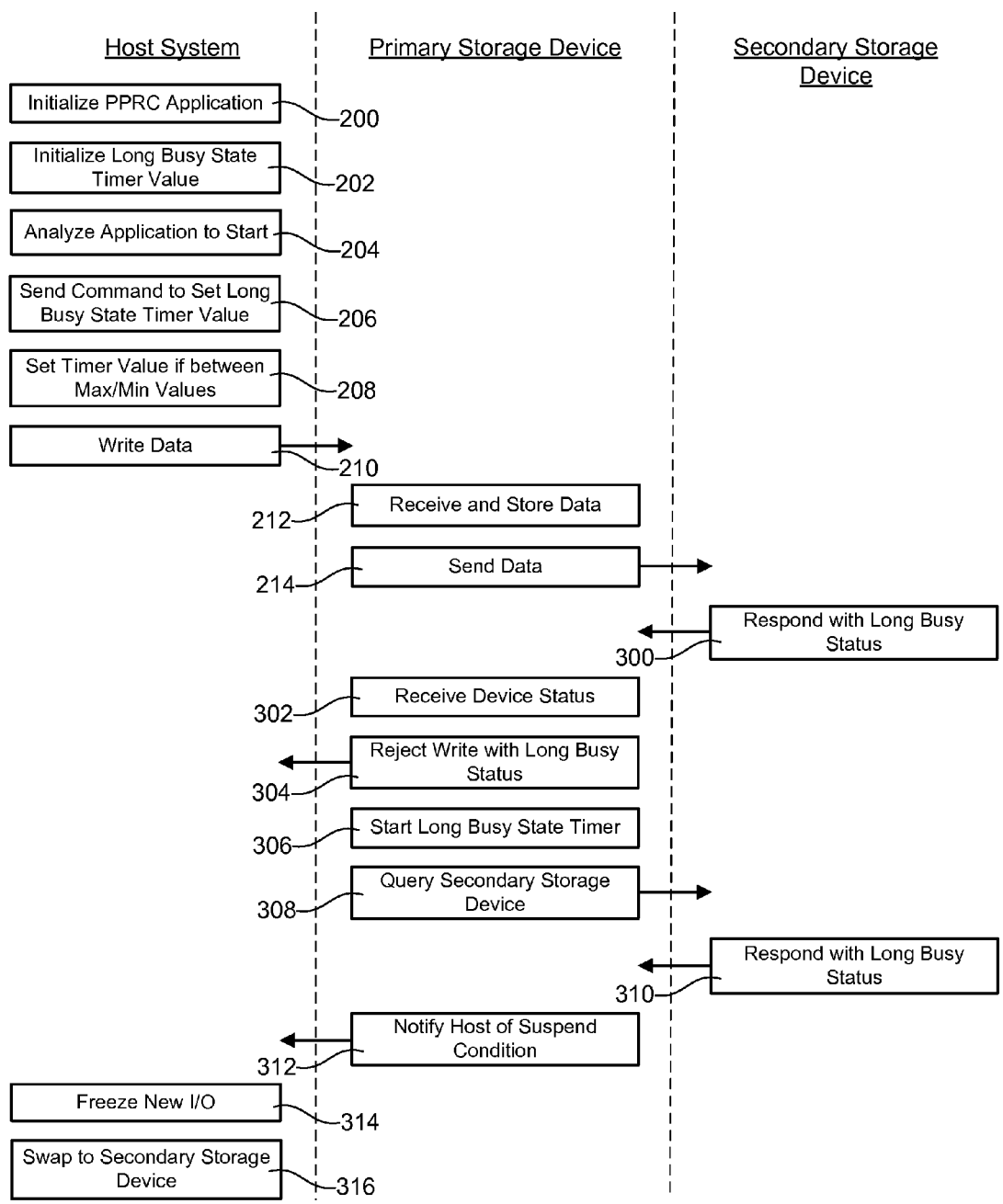
FIG. 3 is a flow chart illustrating another scenario that may be encountered by the system illustrated in FIG. 1.

Referring to FIG. 3, in another scenario, the host system 102 may perform the same basic steps 200, 202, 204, 206, 208 described in association with FIG. 2. The host system 102 may then attempt to write 210 data to the primary storage device 104. The primary storage device 104 may receive 212 and store 212 the data and then send 214 a copy of the data to the secondary storage device 106 to mirror the data to the secondary volumes 114.

In this scenario, the secondary storage device 106 rejects the write and responds 300 with a long busy status. The primary storage device 104 receives 302 this status information and notifies the host system 102 that the write has been rejected 304 due to long busy status. The primary storage device 104 may also initiate 306 the long busy state timer 116 at this time. If the secondary storage device 106 does not notify the primary storage device 104 that it is no longer in long busy state before the timer 116 expires, the primary storage device 104 may query 308 the secondary storage device 106 to determine its status.

If the secondary storage device 106 once again responds 310 with a long busy status, the primary storage device 104 may then notify 312 the host 102 that the primary and secondary volumes 110, 114 are in a suspended state. At this point, the host 102 may invoke its recovery procedure. In selected embodiments, this recovery procedure may include freezing 314 all I/O to the volume pairs in the logical subsystem that are in the suspended state. In certain embodiments, the recovery procedure may also include swapping 316 to the secondary storage device 106, effectively making the secondary storage device 106 the primary storage device 104.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to dynamically alter a long busy state timer in a remote mirror and copy environment, the system comprising:
   a host system to issue a write command;
   a primary storage controller configured to receive the write command and, in response, write data to a primary volume associated with the primary storage controller;
   a secondary storage controller configured to receive a copy of the data from the primary storage controller and mirror the data to a secondary volume associated with the secondary storage controller;
   the secondary storage controller further configured to send a busy signal to the primary storage controller in the event the secondary storage controller is unable to mirror the data to the secondary volume because it is in a busy state;
   the primary storage controller further configured to initiate a timer in the event it receives the busy signal, and notify the host system that the primary and secondary volumes are suspended in the event the busy condition does not end before the timer expires; and
   the host system further configured to dynamically alter the duration of the timer by sending a command to the primary storage controller.

2. The system of claim 1, wherein the host system is configured to dynamically alter the timer duration for different applications running on the host system.

3. The system of claim 1, wherein the host system is configured to dynamically alter the duration of the timer to correspond to other timers operated by the host system.

4. The system of claim 1, wherein the command is configured to modify the timer duration for at least one of a single volume pair, multiple volume pairs, and all volumes in a logical subsystem.

5. A method to dynamically alter a long busy state timer in a remote mirror and copy environment, the method comprising:
   issuing a write command;
   writing data to a primary volume in response to the write command;
   attempting to mirror the data to a secondary volume;
   sending a busy signal in the event a busy condition exists that prevents mirroring the data to the secondary volume;
   initiating a timer in the event the busy signal is sent;
   suspending the primary and secondary volumes in the event the timer expires before the busy condition has ended; and
   dynamically altering the duration of the timer by issuing a command.

6. The method of claim 5, wherein dynamically altering the duration of the timer comprises dynamically altering the duration of the timer for different applications.

7. The method of claim 5, wherein dynamically altering the duration of the timer comprises dynamically altering the duration of the timer to correspond to other timers operated by a host system.

8. The method of claim 5, wherein dynamically altering the duration of the timer comprises dynamically altering the duration of the timer for at least one of a single volume pair, multiple volume pairs, and all volumes in a logical subsystem.

* * * * *